HARRY G. MEISTER JR.
HAROLD R. SCUDDER
DONALD A. HARRIS
INVENTORS

BY
BUCKHORN, BLORE, KLARQUIST & SPARKMAN
ATTORNEYS

3,302,967
OVERHEAD LOAD-HANDLING APPARATUS

Donald A. Harris, Vancouver, Wash., and Harold R. Scudder, Lake Oswego, and Harry G. Meister, Jr., Portland, Oreg., assignors to Hyster Company, Portland, Oreg., a corporation of Nevada
Filed Mar. 8, 1965, Ser. No. 437,964
19 Claims. (Cl. 294—65)

The present invention relates to overhead-type load-handling apparatus for lifting simultaneously a large number of objects, and more particularly relates to such an apparatus for lifting vertically disposed cylindrical objects such as large, heavy paper rolls.

Although the invention will be described in the setting of suction apparatus for use as part of a ship's loading gear, the invention is not intended to be limited to either suction lifting devices or ship's loading gear.

Prior lifting apparatus of the above type ordinarily comprises a series of downwardly projecting grab arms mounted in a frame suspended from an overhead crane. A disadvantage of such prior apparatus is that its grasping arms are so arranged that rows of cylindrical objects to be lifted must be prearranged in a squared pattern, with the objects of each row aligned directly in front of or behind objects of the adjacent rows in order to be handled by such apparatus, thus necessitating an exacting prearrangement of objects to be lifted and resulting in a waste of storage space.

Accordingly, a primary object of the present invention is to provide a load-handling apparatus for lifting groups of vertically disposed objects which eliminates the above disadvantage.

Another object is to provide overhead load-handling apparatus capable of handling both cylindrical objects and objects of other shapes as well.

Another object is to provide overhead load-handling apparatus capable of lifting groups of cylindrical objects without requiring prearrangement of the groups in a square pattern. A related object is to provide such apparatus with means capable of handling objects prearranged in compact, nested rows in which the objects are mutually engaged, thereby to conserve storage space and provide the objects with lateral stability when lifted.

Still another object is to provide a load-handling apparatus of the above type capable of rearranging objects after they are lifted, and, more specifically, capable of picking up cylindrical objects prearranged in squared rows and rearranging such objects in nested rows.

A further object is to provide a load-handling apparatus of the above type capable of lifting groups of objects having substantially flat end surfaces wherein the objects within a group are of slightly different heights so that their top surfaces lie in different horizontal planes.

A further object is to provide apparatus of the above type capable of engaging and picking up objects even though the lifting devices of the apparatus may lie in a plane slightly skewed with respect to the plane of the tops of the objects to be picked up.

In prior overhead lifting apparatus several grasping arms grasp opposite sides of each object in lifting the same. If the objects to be lifted have fragile outer layers, such as the wrappings on large paper rolls, the pressure applied by the grab arms against the sides of the objects frequently damages their outer layers and tends to deform the objects. Moreover, any slight amount of slippage between the gripping surfaces of the arms and the outer surface of the objects, particularly if the outer surface is paper, will almost certainly tear the latter surface.

Accordingly, another object is to provide overhead load-handling apparatus which eliminates most, if not all, of the damage to objects and their coverings that has heretofore occurred because of prior constructions.

A further object of the invention is to provide overhead load-handling apparatus capable of lifting objects by their tops rather than their sides, and specifically to provide apparatus for lifting objects in such manner by means of suction.

In furtherance of the above objects, an illustrated embodiment of the invention includes a horizontally disposed frame structure adapted to be suspended by cables from an overhead gantry-type crane. There are eight downwardly directed suction cups of collapsible construction on the frame arranged in two parallel banks of four suction cups each. The suction cups in each bank are equally spaced apart, and a suitable power means can change the spacing between the heads of each bank while maintaining a uniform spacing between heads for accommodating groups of objects of different diameters. One of the banks is shiftable toward and away from the other bank so that the distance between banks corresponds to the distance between the rows of objects to be picked up. One of the banks is also shiftable parallel to the other bank so that the suction heads in one bank can be positioned in either an opposed or a staggered relationship with respect to the suction heads in the adjacent bank, the latter for picking up objects arranged in nested rows. The combination of the three foregoing movements enables groups of objects to be picked up whether arranged in aligned or nested rows and wherein the objects of one group may be of different diameters than the objects of another group. Although the illustrated preferred embodiments are equipped with suction load-handling devices especially suited for handling paper rolls and other fragile articles, other load-handling devices such as, for example, magnets or mechanical means could be used instead in the apparatus without sacrificing most of the novel and advantageous features of the apparatus.

The foregoing and other features, objects and advantages of the invention will become more apparent from the following description and the accompanying drawings wherein.

FIG. 1 FORM

With reference first to the embodiment of FIGS. 1 through 4 of the drawings, the illustrated load-handling apparatus includes a supporting structure to be lifted including an open rectangular main frame 10 disposed horizontally and having side members 12 and opposite end members 14. Mounted on the opposite end members are a pair of upstanding brackets 16 to which pulleys 18 are rotatably attached for receiving cables 20 which suspend the main frame and its components from overhead lifting equipment, such as, for example, a gantry-type overhead crane (not shown) commonly used on docks or on the decks of ships for handing heavy loads.

Figures 1, 1A, 3:
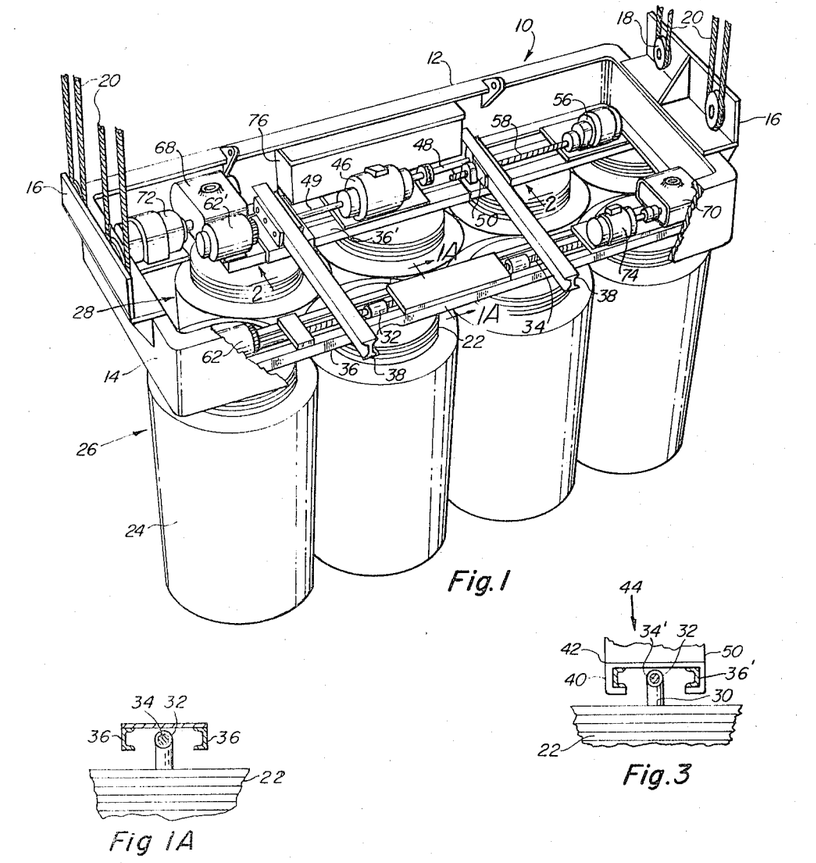
FIG. 1 is a perspective view of an apparatus in accordance with the invention as viewed from above the main frame of the apparatus.
FIG. 1A is a schematic sectional view on a slightly enlarged scale showing the details of construction of the support structure for one bank of suction heads, taken approximately along the line 1A—1A of FIG. 1.
FIG. 3 is a sectional view, on approximately the same scale as FIG. 2, of one of the carriages for shifting the movable bank, taken along the line 3—3 of FIG. 2.

Mounted below the main frame are a plurality of load-engaging devices, in this instance suction heads 22, each with its load-contacting end directed downwardly for engaging the top surface of one of a group of juxtaposed vertical cylindrical objects such as the illustrated paper rolls 24. Each of the suction heads is preferably of a collapsible construction such as, for example, a bellows-type construction described and illustrated in co-pending application Serial No. 390,538, filed August 19, 1964, for "Vacuum Type Load-Handing Mechanism." This construction enables the heads to pick up simultaneously cylindrical objects of slightly different heights and also enables the individual heads to compensate for any slight skew between the normally horizontal plane of the bottoms of the suction heads and the normally horizontal plane of the tops of the cylindrical objects to be picked up, which skew might be caused, for example, by the slight rolling of the ship or an uneven or unstable dock on which the objects might be situated.

The suction heads are arranged in two parallel banks, or lines 26, 28 each containing four suction heads 22a, 22b, 22c, 22d spaced apart uniformly relative to one another.

Figures 4, 15, 16, 17, 18:
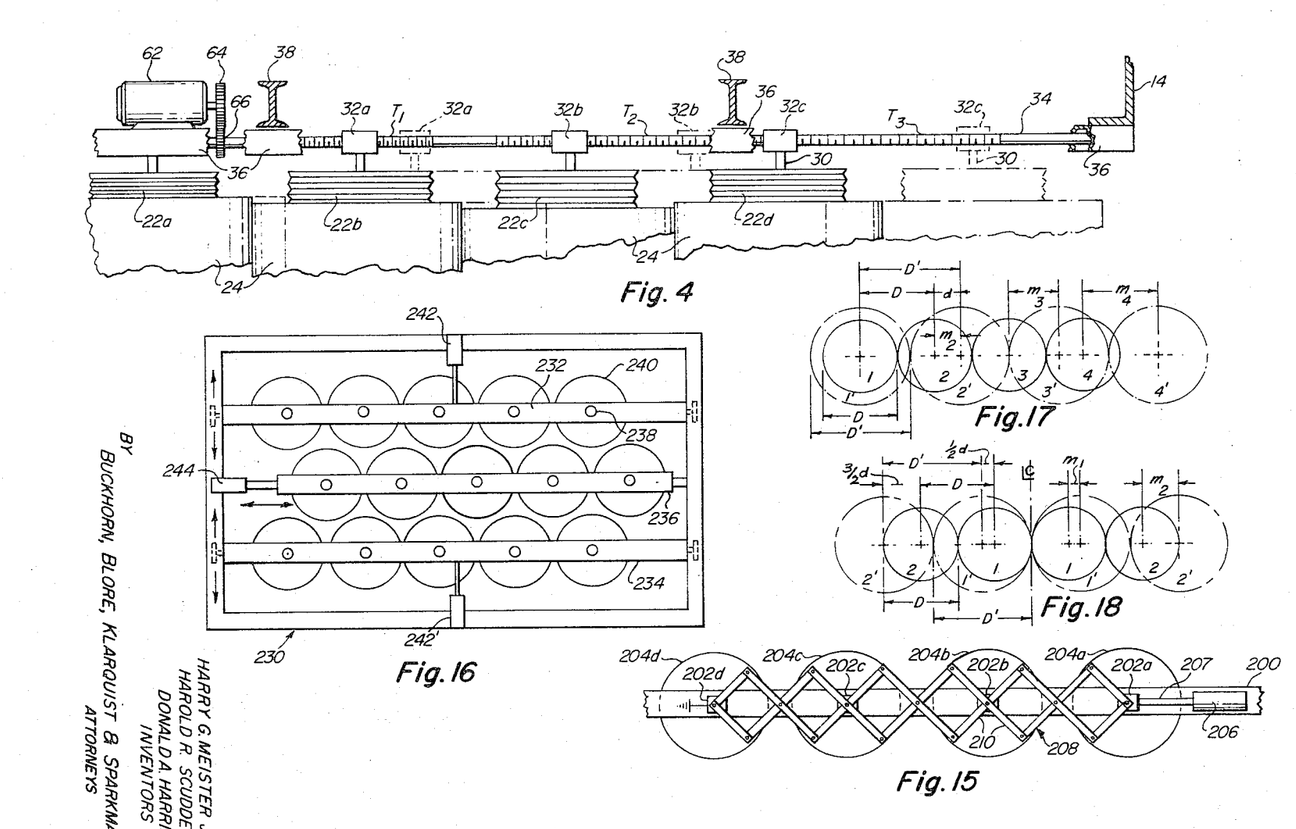
FIG. 4 is a schematic elevational view, on approximately the same scale as FIG. 1, showing the power means, including a lead screw, for shifting the suction heads of a bank relative to one another in the apparatus of FIG. 1.
FIG. 15 is a schematic view of a further modification illustrating the use of lazy tongs for shifting the suction heads of each bank.
FIG. 16 is a schematic plan view of a further modification having three banks of five suction heads each.
FIG. 17 is a diagram illustrating the relative movement between the heads of a bank in the apparatus of FIG. 1 when repositioning the heads to pick up a group of objects of large diameter subsequent to picking up objects of a smaller diameter.
FIG. 18 is a diagram illustrating the relative movement between heads of a bank in the apparatus of FIG. 10 in repositioning the heads to pick up objects of large diameter after having picked up objects of smaller diameter.

As illustrated most clearly in FIG. 4 showing the bank 26 of heads, three of the four suction heads in each bank are suspended by posts 30 from carrier members 32 which are threaded onto a single lead screw 34 rotatably supported between a pair of longitudinal channel members 36 so that rotation of the screw conveys the carriers 32a, 32b and 32c, and thus their respective suction heads 22b, 22c and 22d, along the screw. The fourth suction head 22a, at one end of the bank is fixedly suspended from the channel member 36. The frame members 36 of the bank 26 are affixed to the opposite ends 14 of the main frame and to a pair of I-beam cross frame members 38 extending from side to side of the main frame, so that such bank is stationary.

The bank 28 of heads is suspended as described with respect to bank 26 with the exception that the pair of longitudinal channel members 36' which carry the lead screw 34' of such bank are mounted for both lateral and longitudinal travel relative to the stationary bank 26. As shown best in FIGS. 2 and 3, the channel members 36' are slidably mounted within sleeve-like base portions 42 of a pair of carriage structures 44, each of which is movably supported on one of the cross frame members 38 by a trolley wheel 47 rotatably carried by an outer upright member 51 of the carriage and a drive gear 52 in the outer end of one of a pair of drive shafts 48, 49.

Figure 2:
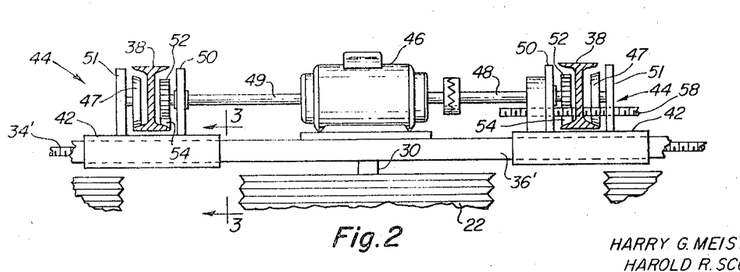
FIG. 2 is a schematic elevational view, on the same scale as FIG. 1A, taken approximately along the line 2—2 of FIG. 1, showing the power means for shifting one bank of suction heads toward and away from the other bank.

With this arrangement the bank 28 is mounted for movement both parallel to and laterally of the bank 26, and power means are provided for effecting these movements. The power means for moving the bank 28 toward and away from the bank 26 includes a reversible electric motor 46 mounted between the two carriages 44 on the longitudinal frame members 36'. Dual drive shafts 48, 49 extend from opposite ends of the motor through inner upright members 50 of the carriages. Each of the shafts 48, 49 has a pinion gear 52 affixed to its outer end, which engages a rack member 54 affixed to the inner face of the lower flange of each I-beam member 38, whereby rotation of the shafts by the motor conveys the carriages 44 and thus the bank 28 along the cross members 38 toward or away from the fixed bank 26 of suction heads, as desired.

Figure 5:
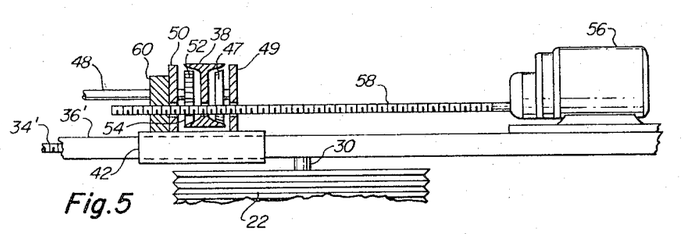
FIG. 5 is a schematic elevational view, partly in section, and on approximately the same scale as FIGS. 2 and 3, of the power means for shifting one bank of suction heads parallel to the other such bank.
Figure 6:
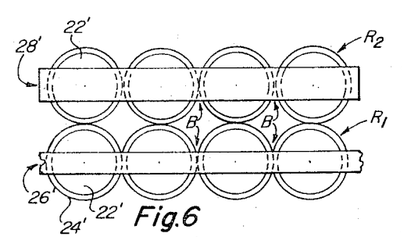
FIGS. 6 and 7 are diagrammatic views illustrating two different positions, respectively, of the suction heads for lifting groups of objects all of the same diameter, with the objects arranged in opposed rows in FIG. 6 and nested rows in FIG. 7.
Figure 7:
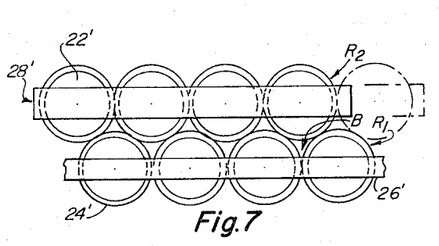

Referring to FIG. 5, the power means for moving the bank 28 parallel to the bank 26 includes a second reversible electric motor 56 mounted at one end of the longitudinal channel members 36'. A lead screw 58 extends from the motor through openings in the inner and outer upright members 50, 51 of the right-hand carriage and through the web of one I-beam member 38, and is threaded through a nut member 60 mounted on the carriage 44. Thus rotation of the lead screw 58 in either direction draws frame members 36' through the base portions 42 of each carriage to move the bank 28 parallel to the bank 26. As will be explained in more detail below, the bank 28 need only travel through a short distance relative to the bank 26 sufficient to shift the suction heads of bank 26 as shown in FIG. 6, to positions staggered between the suction heads of the bank 26 as shown in FIGS. 1 and 7, in which latter position the suction heads are capable of picking up cylindrical objects arranged in juxtaposed nested rows.

It is desirable in the illustrated and other embodiments of the invention to provide for changing the spacing between the individual heads in each bank while maintaining equal spacing between such heads. This enables the banks to be used for picking up groups of objects wherein the objects within different groups are of different diameters but wherein all of the objects within a single group are of the same diameter.

Referring to FIG. 17, the four small circles represent a straight row of small objects of uniform diameter D arranged in contact with one another. The four large circles represent a row of large objects of uniform diameter D' similarly arranged. In picking up the row of small objects the four heads of one bank in the apparatus of FIG. 1 would assume positions designated 1 through 4 wherein the centers of the heads would coincide with the vertical axes of the small objects. In picking up the large objects the heads must be readjusted to the positions 1' through 4' so that their centers coincide with the vertical axes of such objects. In describing the movement of the various heads of a bank during any readjustment of such heads for vertical alignment with a row of objects differing in diameter from those just previously handled, let:

1 = the numerical designation of the position of a reference head of a bank;
$N$ = the numerical designation of the position of any other head with respect to the position of the first, or reference, head;
$m_1$ = the movement of head 1 during any readjustment;
$m_2$ = the movement of head 2 during the same readjustment;
$m_N$ = the movement of head N during the same readjustment;
$D$ = diameter of each small object;
$D'$ = diameter of each large object;
$d$ = the difference in the diameters of the large and small objects.

Assuming that the heads in a bank of the apparatus of FIG. 1 are to be readjusted to pick up the large objects of FIG. 17 after having been adjusted previously to pick up the small objects, head 1, which has been designated the left-hand, or fixed, head of the bank, will remain in its original position, so $m_1=0$. The heads 2 through 4 to the right of head 1 will move different distances to the right depending on the difference in diameter of the original and new objects. Therefore, the number of heads that move is $(N-1)$, or 3. Head 2 will move a distance to the right equal to the distance head 1 moves plus the difference in diameter of the objects. Thus $$m_2 = m_1 + (D'-D)$$

or $m_1+d$, but since $m_1=0$, $m_2=d$. Head 3 must move the distance moved by head 2 ($m_2$), plus an additional $d$. Thus $m_3 = m_2 + d = (m_1+d) + d = m_1 + 2d = 2d$.

Similarly, if there were N number of objects and N number of heads, the Nth head would move according to the formula:

$$m_N = m_{N-1} + d = m_1 + (N-1)d$$

However, where head 1 is fixed as in the apparatus of FIG. 1, $m_1=0$, so the above basic formula can be shortened to:

$$m_N = (N-1)d$$

This formula can be expressed as an arithmetic progression, thus:

$$m_1(1-1)d = 0 = m_1$$
$$m_2 = (2-1)d = d = m_1 + d$$
$$m_3 = (3-1)d = 2d = m_2 + d$$
$$m_4 = (4-1)d = 3d = m_3 + d \text{ etc.}$$

As an example, let it be assumed that the suction heads of FIG. 4 have been adjusted to lift groups of juxtaposed 30-inch rolls of paper ($D=30$), but it is necessary to readjust the spacing of such suction heads so that they can next pick up groups of 40-inch rolls ($D'=40$), with the centers of the heads aligned vertically above the axes of the rolls. Thus the suction heads are initially spaced on 30-inch centers, but their spacing must now be increased so that they are spaced on 40-inch centers. The increment of change necessary is 10 inches ($d=10$). Because suction head 22a (1) is stationary ($m_1=0$) suction head 22b (2) moves 10 inches to the right ($m_2=10$), head 22c (3) moves 20 inches ($m_3=20$), and head 22d (4) moves 30 inches ($m_4=30$) according to the basic formula.

FIG. 18 illustrates the relative movement necessary between heads of a bank in readjusting to pick up a group of large objects, represented by the large circles, after having previously been adjusted to pick up a group of small rolls, represented by the small circles, where there are an even number of heads in a bank and the movement of the heads of a bank are to the right and left of the center line of the bank. Movement from the centerline of the bank is advantageous in that the center of gravity of the load, at all times, remains centered under the frame of the apparatus, as illustrated, for example, in FIG. 10. The movement of each head to the right and left of center can be calculated from the foregoing basic formula $m_N = m_1 + (N-1)d$ by considering the heads on the opposite sides of the centerline separately. Thus in FIG. 18, the first heads to the right and left of center are designated 1, the second heads 2, and so forth. To maintain the center of gravity of the apparatus at its geometric center, the first heads 1 to the right and left of center must move an equal distance to the right and left, respectively. Since the two first heads 1 must move a total distance $d$ to align themselves over the large objects, each must therefore move $\frac{1}{2}d$ ($m_1 = \frac{1}{2}d$). Thus each head 2 to the right and left of center must move in their respective directions, according to the basic formula:

$$m_2 = m_1 + (2-1)d = d/2 + d = 1\frac{1}{2}d$$

If there were three heads to the right and left of center, the heads 3 would move:

$$m_3 = m_1 + (3-1)d = d/2 + 2d = 2\frac{1}{2}d$$

To accomplish the above objective in the FIG. 4 embodiment, the lead screw 34 from which the three suction heads 22b, 22c and 22d of each bank are suspended, is rotated by another reversible electric motor, there being one such motor 62, 62' mounted at one end of each set of longitudinal channel members 36, 36', respectively. Each such motor is operatively connected to its respective lead screw 34, 34' through a set of gears 64, 66. Each lead screw 34, 34' is specially constructed so that the center distances between the suction heads of each bank can be changed while maintaining equal spacing between such heads.

The lead screw 34 is provided with three continuously threaded sections $T_1$, $T_2$ and $T_3$, with the thread in each succeeding section proceeding in a direction away from the fixed head 22a having a larger lead than the thread of the preceding section. Thus, the lead of the thread in section $T_2$ is sufficiently greater than the lead of the thread in section $T_1$ to convey the carrier 32b twice the distance that carrier 32a is conveyed for each turn of the screw 34. Similarly, the thread in section $T_3$ has a sufficiently greater lead than the threads in sections $T_1$ and $T_2$ so that the carrier 32c is conveyed three units for every unit that carrier 32a is conveyed. In other words, there is a progressive 1:2:3 ratio between the leads of the threads in sections $T_1$, $T_2$ and $T_3$ respectively. Of course, the lengths of the several sections $T_1$, $T_2$ and $T_3$ must be adjusted in proportion to the ratios of their leads so that all three sections contain approximately the same number of thread convolutions. This means that normally section $T_3$ will be three times as long, and section $T_2$ twice as long as section $T_1$.

The main frame carries within its confines various other components of the apparatus including a pair of vacuum pumps 68, 70 driven by electric motors 72, 74, respectively. Both pumps operate constantly during normal operation to supply vacuum to each of the suction heads through suitable conduits (not shown). The vacuum within the heads for lifting is controlled from a remote source, as for example, from the cab of the gantry crane which supports the main frame, through suitable flexible connections (not shown) in a manner such that all eight heads can be activated simultaneously. Any individual head not needed during a particular pickup cycle can be deactivated by closing a conventional vacuum control valve, one of which is provided, preferably, within each head and individually controlled by a suitable electric switch in the control cab.

It is desirable that one of the pump motors 72 be an A.C. motor, and that the other, 74, be a D.C. motor, with the latter normally being operable together with the A.C. motor from an A.C. supply, such as the ship's power source, by providing a rectifier in the D.C. motor circuit. However, a battery 76 is carried within the main frame 10 and suitably wired in the D.C. motor circuit so that in the event of an A.C. power failure, the D.C. motor will continue to operate on emergency battery power for at least a sufficient length of time to enable a suspended load to be lowered to the deck or dock as the case may be.

All operations, including relative shifting of the banks laterally and longitudinally, shifting of the heads of each bank, application of vacuum at the heads, and lifting and lowering of the main frame is controlled from the cab of the crane through suitable electrical controls connected to the power units on the main frame by electrical wiring (not shown). The control circuitry and components may be of any type capable of controlling the major power means of the apparatus in the manner described above. Such circuitry and controls, per se, form no part of the present invention.

OPERATION OF FIG. 1 FORM

FIGS. 6 through 9 illustrate diagrammatically the operation of the apparatus of FIG. 1, with the numerals 26' and 28' representing the fixed and movable banks, respectively, the inner circles 22' representing the suction heads, and the outer circles 24' representing the cylindrical objects of each group of objects to be picked up. It will be apparent from a comparison of FIGS. 6 and 8 that the objects of each group to be picked up are of the same diameter but that the objects of different groups may be of different diameters. In any event, the objects of each group are arranged in at least two juxtaposed rows $R_1$ and $R_2$.

From a comparison of FIGS. 6 and 7, it will be seen that the two rows of objects to be picked up can be arranged in either of two patterns. In one pattern, as shown in FIG. 6, the objects of row $R_2$ are positioned directly opposite, or behind, the objects of row $R_1$ so that the bights B formed by the adjacent objects in each row are unoccupied. In another, more compact, pattern, as shown in FIG. 7, the objects of row $R_2$ are in a staggered or nesting relationship with respect to the objects of row $R_1$ so that the objects of each row occupy the bights B formed by the objects of the adjacent row. This latter pattern provides the most compact, and thus the most space-saving arrangement of cylindrical objects possible.

In picking up rows of opposed objects arranged in the block pattern of FIG. 6, the movable bank 28' is moved to a position wherein the suction heads 22' in such bank are directly opposite the suction heads of the stationary bank 26', and the distance between the centers of the suction heads in each bank are adjusted to equal the distance between the centers of the objects to be picked up. The movable bank 28' is also adjusted laterally so that the distance between the two banks 26', 28' equals the center distance between rows $R_1$ and $R_2$. Thus, each of the suction heads of the apparatus can be centered vertically above one of the objects in the group to be lifted, whereafter the frame of the apparatus is lowered until the heads engage the tops of the objects. Vacuum is then applied at the heads to lift the objects upon subsequent raising of the frame.

In picking up objects arranged in the staggered pattern of FIG. 7, the movable bank 28' is shifted parallel to the bank 26' through a distance equal to one-half the distance between centers of the suction heads, or one-half the diameter of the objects to be picked up. Thereafter, the movable bank 28' is shifted laterally inwardly toward the bank 26' until the center distances between banks equals the center distances between the nested rows of objects $R_1$ and $R_2$.

Figure 8:
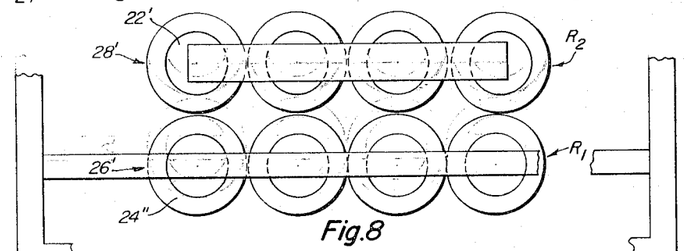
FIGS. 8 and 9 are views similar to FIGS. 6 and 7, respectively, but illustrating the banks and cups repositioned for handling objects of larger diameter than those of FIGS. 6 and 7.

In picking up groups of objects of slightly larger diameter than those of FIGS. 6 and 7, the power means for adjusting the spacing between the individual heads of each bank comes into play. For example, in adjusting the apparatus to pick up the larger objects 24'' arranged in blocked rows as shown in FIG. 8 after lifting smaller objects 24' arranged in the same pattern, as shown in FIG. 6, the movable bank 28' is separated from the bank 26' through a distance equal to the change in the diameters of the objects 24' and 24''. At the same time the suction heads 22' in each bank are separated a distance equal to the change in diameter of the objects of the two groups.

Figure 9:
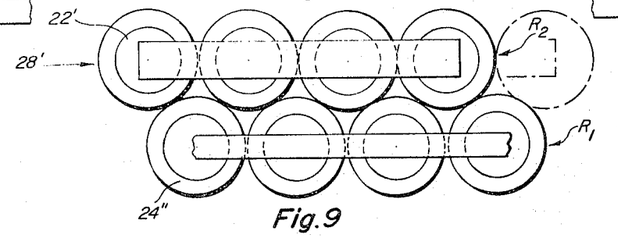

FIG. 9 illustrates objects 24'' having the same diameter as those shown in FIG. 8 but with such objects being arranged in nested relationship so that the movable bank 28' must be shifted parallel to the stationary bank 26' and toward the stationary bank from its FIG. 8 position.

It will be apparent from the preceding discussion that the apparatus can lift objects arranged in a square pattern on, for example, a dock and during the transfer of such objects to the hold of a ship, rearrange the objects so that such objects are deposited in the hold in a nesting relationship. This feature enables a far greater utilization of available storage space both on loading docks and in the cargo holds of ships.

The apparatus of FIG. 1 represents the preferred embodiment of the invention, and whereas other forms of the invention, about to be described, accomplish the same results as that of FIG. 1, such other forms are generally considered less suitable than FIG. 1 because of their greater complexity and expense.

FIG. 10 FORM

Figure 10:
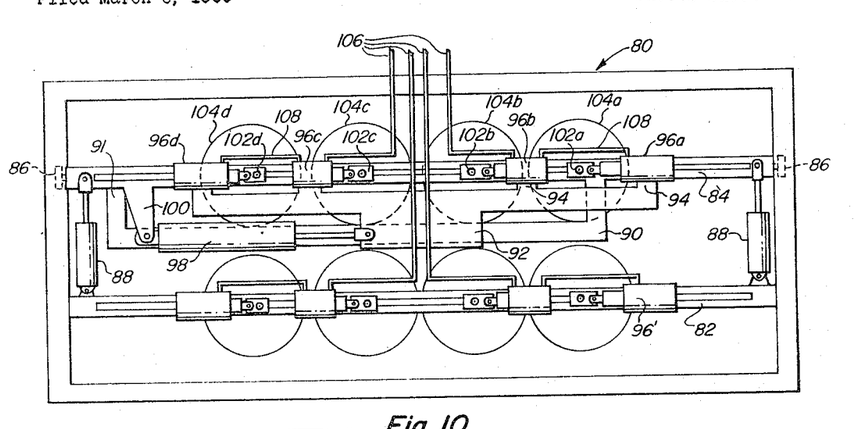
FIG. 10 is a schematic plan view illustrating a modification of the apparatus utilizing hydraulic cylinders for accomplishing relative shifting of the banks and heads.

FIG. 10 illustrates schematically a modification of the invention employing a hydraulic cylinder power means for effecting the bank and head adjustments. The apparatus includes a rectangular main frame 80 within which are mounted two longitudinal monorail tracks 82, 84. The track 82 is rigidly mounted to opposite ends of the main frame, and the track 84 is mounted on rollers 86 at opposite ends of the frame for movement toward and away from the fixed track 82 by a pair of power cylinders 88. A relatively short section of track 90 extends longitudinally between tracks 82 and 84, and is connected by supports 91 to track 84. Track 90 supports a carriage 92 having four laterally extending arms 94 to which four hydraulic cylinders 96a, 96b, 96c and 96d are attached. Another, larger power cylinder 98 is attached at one end by arm 100 to track 84 and is connected at its opposite, rod end to carriage 92 to move the carriage and thus the cylinders 96a–d along tracks 90 and 84 respectively. Similarly four power cylinders 96' corresponding to the cylinders 96 on track 84 are fixedly mounted on the track 82.

Slidably mounted on each track 82, 84 are four carriers 102a, 102b, 102c and 102d from which four suction heads 104a, 104b, 104c and 104d, respectively, are suspended. The piston rod of each power cylinder 96a–d is connected to one of the carriers 102a–d, respectively, so that actuation of the power cylinders moves the carriers along the track 84.

The rod ends of the innermost cylinders 96b and 96c on track 84 and the corresponding cylinders on track 82 are connected through a conventional flow control system, including hydraulic feeder lines 106, to a pump (not shown). The opposite, piston ends of the inner cylinders are connected by lines 108 to the rod ends of the outer cylinders 96a and 96d. The exhaust connections of the outer cylinders are not shown. Equal quantities of fluid are pumped at the same rate through the lines 106 to the inner cylinders through the use of a conventional flow divider (not shown), and the inner and outer cylinders are connected in series and so proportioned with respect to each other that the piston rods of the outer cylinders are displaced through a distance equal to three times that through which the piston rods of the inner cylinders are displaced. That is, according to the formula $m_N = m_1 + (N-1)d$, for every one unit that the rods of inner cylinders 96b and 96c are displaced to the right and left, respectively, of the centerline of the bank, the spacing between their associated heads will increase two units so that the rods of the outer cylinders 96a and 96d must each be displaced a total of 1+2, or 3, units. Such displacements result in displacement of the associated carrier members and suction heads corresponding amounts. Although FIG. 10 illustates a cylinder arrangement wherein the movement of the suction heads is in opposite directions away from the transverse centerline of the bank so that all suction heads move to some extent, it will be appreciated that the cylinders could be arranged so that movement proceeds relative to a stationary end suction head as in the FIG. 1 embodiment.

Figure 11:
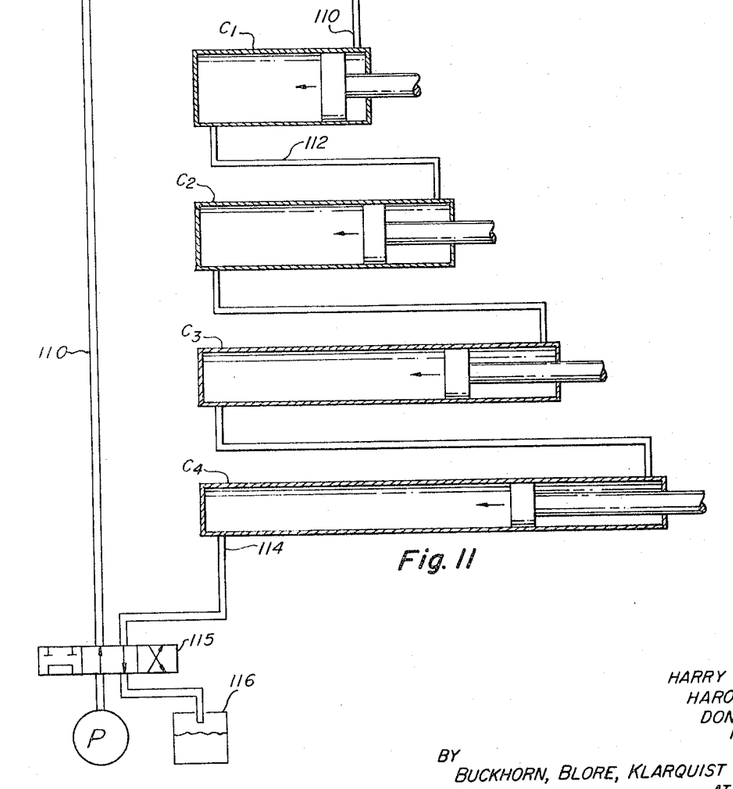
FIG. 11 is a schematic view illustrating a hydraulic cylinder system for shifting the suction heads in a bank.

FIG. 11 illustrates schematically on an enlarged scale a hydraulic cylinder arrangement for effecting an arithmetically progressive increase in the displacement of the cylinder rods of four cylinders $C_1$, $C_2$, $C_3$ and $C_4$ for apparatus in which there are at least five suction heads in each bank, such as shown in FIG. 16, one of which heads, adjacent the cylinder $C_1$, might be fixed The four cylinders are connected in series, with a hydraulic line 110 leading from a pump P to the rod end of cylinder $C_1$. Progressing downwardly in FIG. 10, or downstream in the direction of flow, a hydraulic line 112 connects the piston end of each cylinder to the rod end of the next succeeding cylinder. Connected to the piston end of the last downstream cylinder $C_4$ is an exhaust line 114 which terminates at a tank 16. The cross-sectional areas of the pistons and rods of the various cylinders are so proportioned relative to one another that the piston rod of the succeeding downstream cylinders move a distance that is an arithmetic progression of the distance that cylinder $C_1$ moves. For example, if the cylinders are arranged as in FIG. 10, but with four cylinders on each side of the transverse centerline of the bank so that there are a total of eight heads in a bank, then the rod of cylinder $C_2$ moves three times the distance that the rod of cylinder $C_1$ moves, and the rods of cylinders $C_3$ and $C_4$ move five and seven times, respectively, such distance.

In any case, lines 110 and 114 are connected to a suitable control valve 115 which reverses the flow of fluid through the system when pushed to the left in FIG. 11, whereby the cylinders used are reversible so that the same proportion of movement between the rods of each cylinder can take place in the reverse direction for moving the suction heads back together again after they have once been separated.

FIG. 12 FORM

Figure 12:
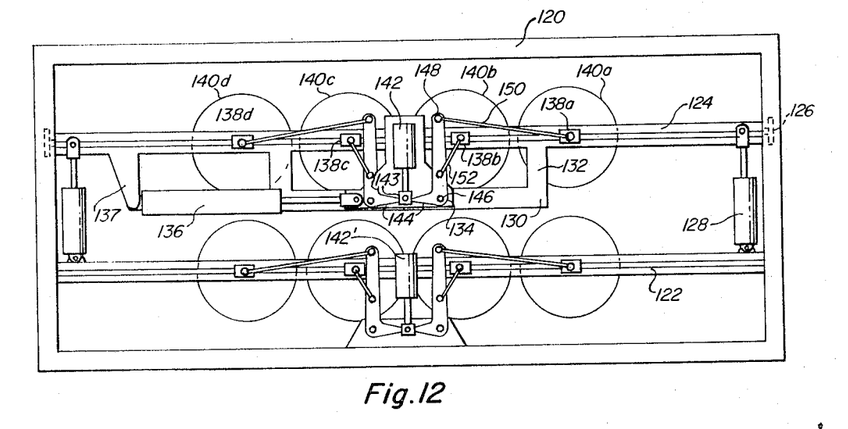
FIG. 12 is a schematic plan view of a further modification illustrating a lever means for shifting the suction heads of each bank.
Figures 13, 14:
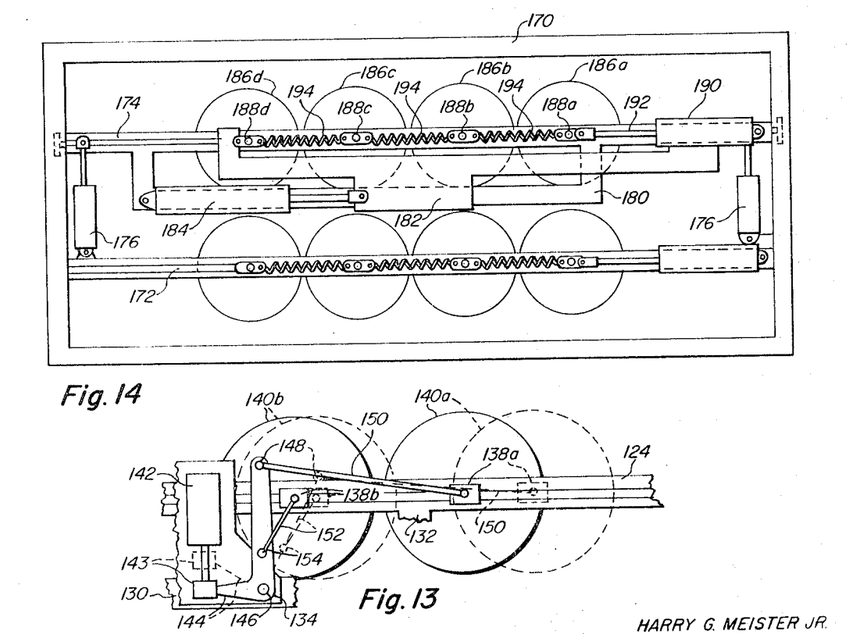
FIG. 13 is an enlarged fragmentary plan view of a portion of the lever system shown in FIG. 12.
FIG. 14 is a schematic plan view of a further modification illustrating the use of springs for shifting the suction heads in each bank.

FIGS. 12 and 13 illustrate a further embodiment of the apparatus in which a lever system is utilized as the head positioning means for each bank. The apparatus includes a rectangular main frame 120, and a pair of monorail tracks, including a track 122 fixed to the frame and a mobile track 124 mounted on wheels 126 at opposite ends of the frame for movement toward and away from the fixed track 122. A pair of power cylinders 128 attached to track 122 impart such movement. A short section of track 130 extends parallel to track 124 and is fixed to the latter track by support arms 132. Track 130 supports a carriage 134 which is moved along the track by a power cylinder 136. Power cylinder 136 is pivotally attached to a support arm 137 extending laterally from track 124. Four equally spaced-apart carriers 138a, 138b, 138c and 138d are slidable along each track 124, 122. Each carrier supports in suspended relationship a suction head 140a, 140b, 140c and 140d, respectively.

Mounted on carriage 134 is a power cylinder 142 having its piston rod 143 connected to one end of a pair of bell crank levers 144 positioned on opposite sides of the cylinder. Each bell crank lever is fulcrumed on the carriage at 146. Pivotally connected to the opposite end 148 of each bell crank lever is a link 150 which in turn is pivotally connected to the outermost carrier 138a. A second, shorter link 152 is pivoted at one end to the long leg of the bell crank lever at pivot 154, which is approximately one-third the distance between fulcrum point 146 and pivot end 148. The opposite end of the short link 152 is pivoted to the inner carrier 138b. The lever and linkage arrangement on both sides of the power cylinder 142 is identical, and the same lever system is used for the carriers on track 122 with the exception that the actuating cylinder 142' is fixedly mounted directly to the track 122 rather than on a carriage.

Referring to FIG. 13, it will be apparent that as the piston rod 143 is retracted to rotate the right-hand bell crank lever 144 in a clockwise direction about the fulcrum point 146, the pivot end 148 will move three times as far as the pivot point 154. Thus, carrier 138a will be shifted along track 124 three times the distance that carrier 138b is displaced in the same direction, and the suction heads connected to such carriers will likewise be displaced away from the transverse centerline of the bank to the same extent. It will thus be seen that the lever system of FIG. 12 will accomplish the same relative movement between suction heads as obtained with the hydraulic system of FIG. 10.

FIG. 14 FORM

FIG. 14 illustrates another modification employing a spring means for repositioning the suction heads in each bank. As before, the apparatus includes a rectangular main frame 170 within which a pair of longitudinal tracks are disposed, including a fixed track 172 and a laterally movable track 174 movable by power cylinders 176 pivoted to track 172. A side track 180 is attached to track 172 and supports a carriage 182 movable along track 180 by power cylinder 184. Four suction heads 186a, 186b, 186c and 186d are suspended from carriers 188a, 188b, 188c, 188d which travel along track 174. The suction heads which form the opposite bank beneath track 172 are mounted in a similar manner.

One end of carriage 182 supports a power cylinder 190 which is connected by cylinder rod 192 to carrier 188a. Carriage 182 is attached at its opposite end to carrier 188d so that such carrier is stationary relative to the carriage. The four carriers in each bank are connected to one another by three springs 194 of equal tension, or K value. Accordingly, when rod 192 is retracted, or moved to the right in FIG. 12, carrier 188a shifts to the right a corresponding distance. However, carrier 188d, anchored to carriage 182, remains in the same position as before whereas the intermediate carriers 188b and 188c shift to the right sufficient amounts to equalize the distances between all four carriers. Stated differently, if carrier 188a and its connected head moves a distance of one unit to the right, carrier 188b and its head will move two-thirds such distance, carrier 188c and its head 188 will move one-third such distance, and carrier 188d remains fixed in its initial position.

The entire bank of suction heads beneath 174 can be shifted through a limited distance parallel to track 172 through movement of the carriage 182 by power cylinder 184.

FIG. 15 FORM

FIG. 15 illustrates schematically a further embodiment utilizing a system of lazy tongs as a means for repositioning the heads of a bank. A track 200 may be one of two or more mounted within a frame (not shown) such as described with reference to the previous embodiments. The track supports four carriers 202a, 202b, 202c, 202d from which suction heads 204a, 204b, 204c, 204d are suspended. The carrier 202d is anchored on the track, and the other three carriers are mounted to slide along the track. A power cylinder 206 mounted at one end of the track has a piston rod 207 connected to movable carrier 202a. Also connected at one end to carrier 202a is a lazy tong 208 composed of several sets of pivotally interconnected linkages 210. The opposite end of the lazy tong is connected to the anchored carrier 202d. With this arrangement, movement of the carrier 202a through a predetermined distance by the cylinder rod 207 causes movement of the adjacent carrier 202b through two-thirds, and the carrier 202c through one-third of such distance, with the carrier 202d remaining fixed. Thus, movement corresponding to the movements of their associated carriers is effected for each of the suction heads 204.

From the foregoing description of several mechanical means for repositioning the suction heads of each bank while maintaining equal spacing between the individual heads in each bank, it will be apparent that there are numerous mechanical arrangements for accomplishing this objective. No doubt, other mechanical arrangements not described herein could be devised, as, for example, a system of cams, gears, or various combinations of mechanical or hydraulic means. However, such other arrangements as are not described herein should be within the reach of those having ordinary skill in the mechanical arts, the disclosed arrangements being illustrative only.

FIG. 16 FORM

All of the embodiments described thus far have consisted of two banks of four suction heads each. However, the apparatus may contain any number of banks greater than two with each bank containing as many suction heads as desired within practical limitations. For example, FIG. 16 illustrates schematically an apparatus having three banks of five suction heads each, or a total of 15 suction heads. This arrangement includes a rectangular frame 230 within which two outer tracks 232 and 234 and an inner track 236 are mounted. Suspended from movable carriers 238 on each track are five suction heads 240.

Power means (not shown), as, for example, any one of the several arrangements previously described, may be mounted in conjunction with each of the tracks for changing uniformly the center distances between the heads 240 of each bank. The lateral distance between banks is adjusted by moving the outer tracks 232 and 234 laterally toward and away from the inner track 236 through equal distances by a power cylinder 242, 242′ for each track in order to accommodate cylindrical objects of different diameters. The banks are also relatively shiftable parallel to one another for rearranging the suction heads in the different banks from a block to a nested relationship by shifting the center track 236 longitudinally relative to the two outer tracks 232 and 234. For this purpose a power cylinder 244 fixed to one end of the main frame 230 is attached to the longitudinally movable inner track 236.

If three or more rows of heads are used, the tracks may be readjusted laterally by any of the means heretofore described for readjusting the spacing between heads in a single row because the problem of proportionate movement is the same in either instance. That is, lateral movement of the rows will follow the basic formula:

$$m'_{N'} = m_1' + (N'-1)d'$$

where $m'$ = amount of lateral movement of a row
$d'$ = increment in spacing needed between rows
$N'$ = position of any row with respect to a reference row number 1.

Having illustrated and described a preferred embodiment of the invention and some modifications thereof, it should be apparent to those skilled in the art that the invention permits of modification in arrangement and detail. We claim as our invention all such modifications as come within the true spirit and scope of the appended claims.

We claim:

1. A load-handling apparatus for lifting groups of cylindrical objects wherein the objects of each group are of the same diameter but the objects of different groups may be of different diameters and wherein the objects of each group are arranged with their axes vertically disposed and wherein each group comprises at least two juxtaposed rows of objects wherein the bights formed by the objects of each row are occupied by objects of an adjacent row, said apparatus comprising a supporting structure to be lifted, a plurality of downwardly directed load-engaging devices each for engaging and lifting a different one of said objects, said load-engaging devices being arranged on said supporting structure in at least two parallel banks wherein each bank contains a plurality of said load-engaging devices, the load-engaging devices of each bank being uniformly spaced relative to one another, power means for shifting the load-engaging devices of each bank relative to one another so that the center distances between the devices of each bank correspond to the center distances between the objects of the group of objects to be picked up by such bank, power means for relatively shifting said banks parallel to one another to positions where the load-engaging devices of one bank are in staggered relation to the load-engaging devices of the adjacent bank and in symmetrical relationship thereto, and power means for shifting the banks relatively toward and away from one another so that the lateral spacing of the banks is the same as the lateral spacing of the rows of cylindrical objects to be picked up whereby to facilitate disposing said apparatus above said group of cylindrical objects with the load-engaging devices in register vertically with corresponding objects, whereafter said load-engaging devices may be lowered into lifting engagement with said objects to enable picking up of said group.

2. A suction load-handling apparatus for lifting groups of cylindrical objects wherein the objects of each group are of the same diameter but the objects of different groups may be of different diameters and wherein the objects of each group are arranged with their axes vertically disposed and wherein each group comprises at least two juxtaposed rows of objects wherein the bights formed by the objects of each row are occupied by objects of an adjacent row, said apparatus comprising a supporting structure to be lifted, a plurality of downwardly directed suction heads on said supporting structure arranged in at least two parallel banks wherein each bank contains a plurality of heads, the suction heads of each bank being uniformly spaced relative to one another, power means for shifting the heads of each bank so that the center distances of the heads of the banks correspond to the center distances of the objects of the group of objects to be picked up, power means for relatively shifting said banks parallel to one another to positions where the heads of one bank are in staggered relation to the heads of the adjacent bank and in symmetrical relationship thereto, and power means for shifting the banks relatively toward and away from one another so that the lateral spacing of the banks is the same as the lateral spacing of the rows of cylindrical objects to be picked up whereby to facilitate disposing said apparatus above said group of cylindrical objects with the heads in register with corresponding objects, whereafter said apparatus may be lowered onto said heads and a vacuum created in said heads to enable picking up of said group.

3. A load-handling apparatus for lifting groups of cylindrical objects wherein the objects of each group are of the same diameter, but the objects of different groups may be of different diameters and wherein the objects of each group are arranged with their axes vertical and wherein each group comprises at least two juxtaposed rows of objects wherein the objects of each row may be either nested within the bights formed by the objects of the adjacent row or arranged directly opposite the objects of the adjacent row, said apparatus comprising:

a supporting structure to be lifted, a plurality of downwardly directed load-engaging devices on said supporting structure arranged in at least two parallel banks wherein each bank contains a plurality of devices, the load-engaging devices of each bank being uniformly spaced apart relative to one another, power means on said supporting structure for changing the center distances between said devices in each bank while maintaining an equally spaced relationship between said devices so that the centers of the devices of each bank are disposed vertically above the centers of the objects in the row of objects to be picked up by such bank, power means on said supporting structure for relatively shifting said banks parallel to one another through a distance such that the devices in each bank can be positioned either in alignment behind devices of the adjacent bank normal to the alignment of such adjacent bank or in staggered relationship between the devices of the adjacent bank, and power means on said supporting structure for relatively shifting said banks toward and away from one another so that the center distance between banks is the same as the center distance between adjacent rows of cylindrical objects to be picked up, whereby each of the load-engaging devices of said apparatus can be disposed vertically above a different one of the objects in the group of objects to be picked up by said apparatus, whereafter said supporting structure can be lowered to a position wherein said devices can engage and lift said objects.

4. A suction-type overhead load-handling apparatus for lifting simultaneously a multiplicity of vertically disposed cylindrical objects, said objects being of equal diameter and being arranged in at least two juxtaposed parallel rows, said apparatus comprising:

a supporting structure to be lifted, at least two parallel and generally horizontally disposed lines of suction heads, each line containing a multiplicity of more than three aligned and equally spaced-apart suctions heads, power means for relatively shifting said lines parallel to one another through a distance such that the suction heads in each line can be arranged alternatively either in opposed relationship behind or in staggered relationship between the suction heads in the adjacent line, power means for relatively shifting said lines laterally toward and away from one another so that the distance between lines corresponds to the distance between the adjacent rows of objects to be picked up, and power means for changing the center distances between the suction heads in each line and maintaining said center distances uniform such that the centers of the suction heads in each line can be disposed above the centers of the objects to be picked up in one of said rows.

5. A suction load-handling apparatus for lifting groups of cylindrical objects wherein the objects of each group are of the same diameter but the objects of different groups may be of different diameters and wherein the objects of each group are arranged with their axes vertical and wherein each group comprises at least two juxtaposed rows of objects wherein the objects of each row may be either nested within the bights formed by the objects of the adjacent row, or arranged directly opposite the objects of the adjacent row, said apparatus comprising a supporting structure to be lifted, a plurality of downwardly directed suction heads on said supporting structure, said heads arranged in parallel banks, each containing a plurality of said heads, means mounting the heads of each bank for movement relative to one another and parallel to the other bank, said suction heads in each bank being uniformly spaced apart along said bank, means mounting at least one of said banks for movement toward and away from the other of said banks, means mounting at least one of said banks for movement parallel to the other of said banks, first power means on said supporting structure for shifting said banks relatively parallel to one another through a distance such that the suction heads in each bank can be repositioned from an opposed relationship with the suction heads of the opposite bank to a staggered relationship with the suction heads of the opposite bank wherein the centers of the suction heads in each bank are substantially equidistant from the centers of the most closely adjacent suction heads in the opposite bank, second power means on said supporting structure for shifting said banks laterally relative to one another so that the distance between banks corresponds to the distance between the rows of objects to be picked up by said bank, third power means on said supporting structure for simultaneously changing the center distance between all of the suction heads in each bank while maintaining a uniform spacing between the suction heads in each said bank, said suction heads being individually adjustable vertically so that all of said heads can be lowered into substantially simultaneous contact with the group of objects to be picked up regardless of slight variations in the height of the objects or slight angular deviations of the plane of the suction heads from the plane of the tops of the objects to be picked up.

6. A suction-type overhead load-handling apparatus for lifting simultaneously a multiplicity of vertically disposed cylindrical objects having the same diameter and being arranged in at least two juxtaposed rows, said apparatus comprising:

a supporting structure to be lifted, a plurality of downwardly directed suction heads on said supporting structure arranged in at least two parallel banks, each containing a plurality of said heads, the suction heads of each bank being uniformly spaced apart relative to one another, first power means for relatively shifting said banks parallel to one another through a distance such that the suction heads in each bank can be shifted from positions opposite the suction heads in the adjacent bank to positions midway between the suction heads in the adjacent bank, second power means on said supporting structure operable independently of said first power means for relatively shifting said banks toward and away from one another so that the spacing between banks can be adjusted to correspond to the spacing between the rows of objects to be picked up, and third power means on said supporting structure for changing the center distances between suction heads in each bank while maintaining a uniform spacing between suction heads in each such bank, vacuum pump means on said supporting structure for creating a vacuum in said suction heads after said heads have been lowered into contact with said objects to enable picking up said objects, and control means remote from said supporting structure for selectively operating said first, second and third power means and said vacuum pump means whereby each of said suction heads can be disposed vertically above one of the objects in the rows of objects to be picked up, and said objects can be picked up upon the lowering of the same into contact with said objects.

7. An apparatus according to claim 1 wherein each bank includes at least three in-line load-engaging devices, at least two of which are movable relative to the third, and wherein said power means for shifting said devices includes means for moving each device, proceeding in a direction away from said third device, through a distance equal to the sum of the distance through which the preceding adjacent device moves plus an increment corresponding to the desired change in spacing between devices.

8. An apparatus according to claim 1 wherein each bank includes at least three in-line load-engaging devices, the first of which is fixed, and wherein said power means for shifting the other said devices includes means for automatically shifting said other devices relative to said fixed device according to the formula $m_N = (N-1)d$ wherein N is the numerical designation of the position of any movable device with respect to the fixed device, $m_N$ is the distance device N moves, and $d$ is the increment in spacing desired between devices and also the distance the movable device closest to the fixed device moves.

9. Apparatus according to claim 1 wherein said power means for shifting the load-engaging devices of each bank includes lead screw means having a number of threaded sections along said means corresponding to the number of movable devices in each bank, each of said movable devices including means for conveying the head along one of said sections upon rotation of said lead screw means, the lead on the threads of each said section being different than the lead of the threads on each of the other said sections such that the center distances between devices on each bank remain substantially uniform during the rotation of said lead screw means and the changing of the center distances between said devices.

10. Apparatus according to claim 1 wherein said power means for shifting the load-engaging devices of each bank includes spring means connecting the adjacent devices of each bank such that the changing of the center distance between any two adjacent ones of the devices of a bank causes a corresponding change in the center distances between each of the other adjacent devices in the same said bank.

11. Apparatus according to claim 1 wherein said power means for shifting the load-engaging devices of each bank includes a plurality of hydraulic cylinder means, there being a hydraulic cylinder means for shifting each of the movable devices in each bank, at least two of said cylinder means being connected in series and having dimensions proportionate to one another such that a change in length of one of said connected cylinder means results in a change in length of the other of said connected cylinder means equal to the sum of the change in length of said one cylinder means plus an increment equal to the change in spacing desired between devices.

12. Apparatus according to claim 1 wherein said power means for shifting the load-engaging devices of each bank includes lever means arranged so that movement of one of the devices in a bank through a given distance results in a movement of an adjacent device in the same bank through a distance equal to the sum of the distance through which said one devices moves plus an increment of distance corresponding to the change in spacing desired between devices.

13. A suction load-handling apparatus for lifting groups of vertically disposed cylindrical objects, wherein the objects within a group are of the same diameter, said apparatus comprising:
a supporting structure to be lifted,
a plurality of downwardly directed suction heads on said supporting structure arranged in at least two parallel banks, each of said banks containing a plurality of uniformly spaced-apart heads,
means on said supporting structure mounting the heads of each bank for in-line movement relative to one another,
means on said supporting structure mounting said banks for movement relative to one another in a direction toward and away from one another and in a direction parallel to one another,
power means on said structure for changing the spacing between heads of each bank, including means for shifting successive ones of said heads in each bank through progressively greater distances, the distance through which each succeeding one of said successive heads is moved, proceeding in a direction away from the one of said successive heads that moves the shortest distance, being an arithmetic progression of the distances through which the preceding ones of said successive heads are moved, such that the uniform spacing between heads is maintained when said heads are shifted,
power means for relatively shifting said banks parallel to one another to positions wherein the heads of each bank are in a staggered, symmetrical relationship to the heads of the other bank,
and power means for shifting the banks relatively toward and away from one another so that the spacing between the banks is the same as the spacing between adjacent rows of cylindrical objects to be picked up.

14. A suction load-handling apparatus for lifting groups of vertically disposed cylindrical objects, wherein the objects within a group are of the same diameter, said apparatus comprising:
a supporting structure to be lifted,
a plurality of downwardly directed suction heads on said supporting structure arranged in at least two parallel banks,
each said bank containing at least four uniformly spaced-apart suction heads,
power means on said structure for shifting two of said suction heads in each bank in one direction away from the transverse center line of said bank and for shifting two others of said heads in each bank in an opposite direction away from said center line,
said power means including means for separating the heads of each bank while maintaining equal spacing between such heads by moving the two inner suction heads on opposite sides of said center line through equal distances and simultaneously moving the two outer heads adjacent said inner heads three times the distance through which said inner heads are moved,
power means for relatively shifting said banks parallel to one another to positions wherein the heads of each bank are in a staggered, symmetrical relationship to the heads of the other bank,
and power means for shifting the banks relatively toward and away from one another so that the spacing between banks is the same as the spacing between adjacent rows of cylindrical objects to be picked up.

15. A suction load-handling apparatus for lifting groups of vertically disposed cylindrical objects, wherein the objects within a group are of the same diameter, said apparatus comprising:
a supporting structure to be lifted,
a plurality of downwardly directed suction heads on said supporting structure arranged in at least two parallel banks,
each of said banks containing at least three in-line and uniformly spaced-apart suction heads, including one head fixedly mounted with respect to the others at one end of said bank, the others of said heads in each bank being movable relative to said one head,
power means for shifting the movable heads of each bank including means for moving the first movable head next adjacent said one head through a predetermined distance, for moving the next succeeding movable head, proceeding a direction away from said one head, through a distance which is twice said predetermined distance, and for moving each succeeding movable head through a distance which is an arithmetic progression of the distances through which the preceding heads move, power means for relatively shifting said banks parallel to one another to positions wherein the heads of each bank are in a staggered, symmetrical relationship to the heads of the other bank, and power means for shifting the banks relatively toward and away from one another so that the spacing between banks is the same as the spacing between adjacent rows of cylindrical objects to be picked up.

16. An overhead load-handling apparatus for lifting simultaneously a multiplicity of vertically disposed cylindrical objects arranged in parallel rows, said apparatus comprising:

a horizontally disposed rectangular main frame adapted to be suspended above the objects to be lifted, a first subframe fixedly mounted on said main frame and extending longitudinally thereof, a second subframe movably mounted on said main frame in parallel relationship to said first subframe, means mounting said second subframe for horizontal movement relative to said main frame and parallel to said first subframe, carriage means on said main frame mounting said second subframe for horizontal movement relative to said main frame and toward and away from said first subframe, said first and second subframes each including a lead screw extending longitudinally of said subframes, a plurality of carrier members threadedly mounted in spaced-apart relationship on each of said lead screws, a plurality of suction heads, each supported by and depending from a different one of said carrier members, a motor on each said subframe for rotating said lead screws, power means on said second subframe for moving said second subframe parallel to said first subframe and thereby moving the suction heads beneath said second subframe parallel to the suction heads beneath said first said subframe, additional power means on said second subframe for moving said carriage and second subframe toward and away from said first subframe and thereby shifting the suction heads beneath said second subframe toward and away from the suction heads beneath said first subframe, each of said lead screws having a thread with a variable lead such that rotation of said lead screw effects a change in spacing between the carrier members on said lead screw while maintaining an equal spacing between said carrier members whereby the spacing between the suction heads carried by said members is correspondingly changed.

17. An apparatus for lifting groups of cylindrical objects according to claim 1 wherein the power means for shifting the load-engaging devices of each bank relative to one another includes means for shifting the movable devices in each bank according to the formula $$m_N = m_1 + (N-1)d$$

wherein N is the numerical designation of the position of any movable device with respect to a reference device, 1 is the numerical designation of the reference device, $m_N$ is the distance device N moves, $m_1$ is the distance, if any, the reference device moves, and $d$ is the increment in spacing desired between objects.

18. An apparatus according to claim 1 wherein there are at least three laterally spaced banks of load-engaging devices mounted for relative lateral movement with respect to one another, and wherein said power means for shifting the banks relatively toward and away from one another includes means for shifting the banks laterally relative to one another according to the formula $$m'_N = m'_1 + (N'-1)d'$$

wherein N' is the numerical designation of the position of any laterally movable bank with respect to a reference bank, 1 is the numerical designation of the reference bank, $m'_{N'}$ is the lateral distance bank N' moves, $m'_1$ is the distance, if any, the reference bank moves, and $d'$ is the increment in spacing desired between banks.

19. An apparatus according to claim 1 wherein the power means for relatively shifting said banks parallel to one another and the power means for shifting the banks relatively toward and away from one another are operable independently of one another.

References Cited by the Examiner

UNITED STATES PATENTS

| | | | |
|---|---|---|---|
| 1,110,409 | 9/1914 | Sutherland | 294—65 |
| 2,658,789 | 11/1953 | Tellier | 294—64 |
| 2,890,077 | 6/1959 | Littell | 294—65 |
| 2,924,484 | 2/1960 | Tolsma | 294—87 |
| 3,212,808 | 10/1965 | Breslav | 294—87 X |
| 3,230,001 | 1/1966 | Hirt | 294—64 |

OTHER REFERENCES 1,130,569, German Printed Application, Corbin, May 1962. (Kl. 35B 6–22)

GERALD M. FORLENZA, *Primary Examiner.*

G. F. ABRAHAM, *Assistant Examiner.*